United States Patent [19]

Kübler et al.

[11] Patent Number: 5,083,078
[45] Date of Patent: Jan. 21, 1992

[54] DEVICE FOR SUPPLYING POWER TO AN ELECTRONIC COMPUTER IN A MOTOR VEHICLE

[75] Inventors: Helmut Kübler, Affalterbach; Freidrich Kübler, Böblingen, both of Fed. Rep. of Germany

[73] Assignee: Daimler-Benz AG, Fed. Rep. of Germany

[21] Appl. No.: 691,416

[22] Filed: Apr. 25, 1991

[30] Foreign Application Priority Data

May 12, 1990 [DE] Fed. Rep. of Germany ....... 4015351

[51] Int. Cl.$^5$ .......................... G05F 1/46; H02M 3/00
[52] U.S. Cl. .................................. 323/268; 323/276; 323/299; 361/18; 340/660
[58] Field of Search ............... 323/268, 269, 272, 274, 323/275, 276, 282, 284, 285, 299, 303; 361/18; 340/438, 459, 461, 660, 661, 662, 663

[56] References Cited

U.S. PATENT DOCUMENTS

| | | | |
|---|---|---|---|
| 3,284,692 | 11/1966 | Gautherin | 323/268 |
| 4,428,020 | 1/1984 | Blanchard, Jr. | 361/18 |
| 4,502,152 | 2/1985 | Sinclair | 323/268 |
| 4,879,504 | 11/1989 | McVey | 323/272 |
| 4,881,023 | 11/1989 | Perusse et al. | 323/282 |
| 5,034,676 | 7/1991 | Kinzalow | 323/268 |

FOREIGN PATENT DOCUMENTS

| | | |
|---|---|---|
| 1136001 | 9/1962 | Fed. Rep. of Germany . |
| 2933029 | 2/1980 | Fed. Rep. of Germany . |
| 3837071 | 2/1990 | Fed. Rep. of Germany . |

*Primary Examiner*—Peter S. Wong
*Attorney, Agent, or Firm*—Evenson, Wands, Edwards, Lenahan & McKeown

[57] ABSTRACT

A device for supplying power to an electronic computer in a motor vehicle has first and second voltage regulators, operable independently of one another and having parallel inputs and outputs, and in which a desired output voltage is regulated downwards from an input voltage provided by a vehicle network. The first and second regulators each include at least one capacitive storage element at their inputs. A protective device is coupled to the inputs of the first and second regulators for connecting and disconnecting the first and second regulators from the input voltage. A voltage monitoring circuit is coupled to the first and second regulators and the protective device for detecting and evaluating the input voltage and includes at least one output each for individually controlling activation of the first and second regulators and the protective device. The voltage monitoring circuit includes circuit for controlling, as a function of an evaluation result of the input voltage: no activation of the first and second regulators in an input voltage range from zero up to a first limit; activation of the first regulator in the input voltage range exclusively between the first and a second limit; activation of the second regulator in the input voltage range exclusively between a third and a fourth limit, the third limit being below and the fourth limit above the second limit; and activation of the protective device above the fourth limit for disconnecting the first and second regulators from the input voltage to be regulated downwards.

14 Claims, 1 Drawing Sheet

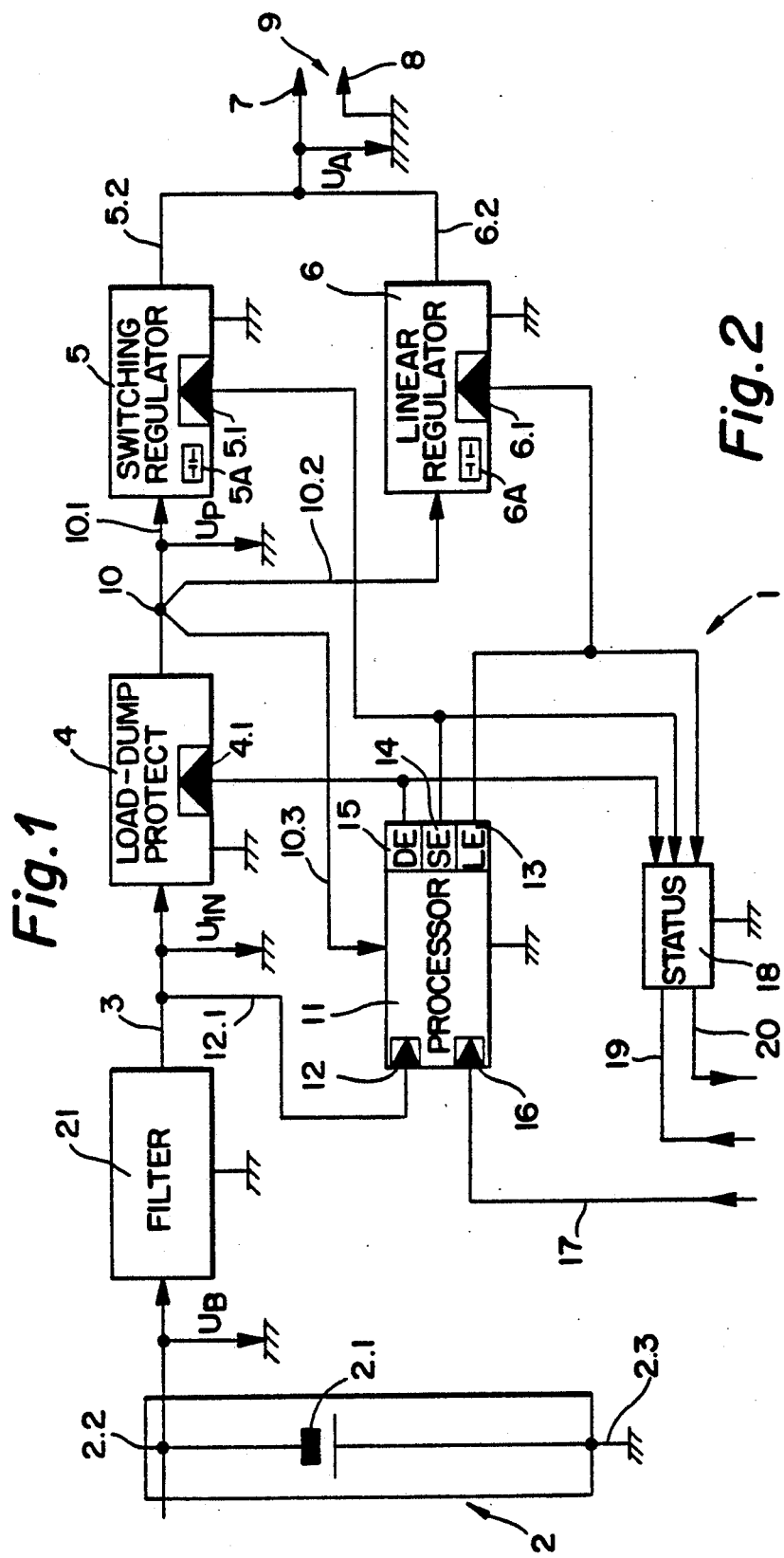

DEVICE FOR SUPPLYING POWER TO AN ELECTRONIC COMPUTER IN A MOTOR VEHICLE

BACKGROUND AND SUMMARY OF THE INVENTION

The present invention relates to a device for supplying power to an electronic computer in a motor vehicle, having two voltage regulators which are operable independently of one another and act in parallel at both their inputs and outputs, and in which the desired output voltage is regulated downwards from the input voltage, with the first regulator being embodied as a linear regulator and the second regulator as a switched-mode regulator.

Multifarious task definitions in the control technology of motor vehicles increasingly demand the use of computers for measurement, control and recording purposes. Also, the operation of personal computers in the motor vehicle is to be made easier for passengers. Such instruments urgently require an uninterrupted power supply which shields such items of equipment reliably from dips in vehicle network voltage, for example during starting of the internal combustion engine, or from voltage peaks in the event of load dumping. Appropriate solutions to these problems have so far provided relatively large-volume circuits, which have also comprised, inter alia, a booster battery for ensuring a stored energy time during starting. The costs of these devices have been correspondingly high, and they have, moreover, not been maintenance-free in the case of the use of a booster battery.

German Patent Document 3,837,071 discloses a power supply system in which at least two power packs are connected in parallel on the output side in order to feed a common load. In this arrangement, the output power of the respective power pack is regulated by its temperature.

Related solutions were described in the specialist journal Electronic Design 14, Nov. 1985, pages 125 to 132. These solutions are intended to create a reliable possibility of operation up to the thermal overload limit of each individual module of a multiplicity of power supply modules acting in parallel.

An object of the present invention is to provide a device for supplying power to an electronic computer in a motor vehicle, which guarantees a proper power supply within a very wide input oltage range and without the use of booster batteries, and in addition protects connected loads against overvoltages.

This and other objects are achieved by the present invention which provides a device for supplying power to an electronic computer in a motor vehicle and has first and second voltage regulators, operable independently of one another and having parallel inputs and outputs, and in which a desired output voltage is regulated downwards from an input voltage provided by a vehicle network. The first and second regulators each include at least one capacitive storage means at their inputs. A protective device is coupled to the inputs of the first and second regulators, this protective device including means for connecting and disconnecting the first and second regulators from the input voltage. A voltage monitoring circuit is coupled to the first and second regulators and the protective device. The voltage monitoring circuit detects and evaluates the input voltage to be regulated downward from the vehicle network and includes at least one output each for individually controlling activation, voltage range by voltage range, of the first and second regulators and the protective device. The voltage monitoring circuit includes means for controlling, as a function of an evaluation result of the input voltage to be regulated downwards: no activation of the first and second regulators in an input voltage range from zero up to a first limit; activation of the first regulator in the input voltage range exclusively between the first and a second limit; activation of the second regulator in the input voltage range exclusively between a third and a fourth limit, the third limit being below and the fourth limit above the second limit; and activation of the protective device above the fourth limit for disconnecting the first and second regulators from the input voltage to be regulated downwards. In an embodiment of the invention, the first regulator is a linear regulator and the second regulator is a switched-mode regulator.

The present invention has the advantage of enabling a computer in a motor vehicle to have a reliable continuous supply in a wide range of fluctuation of the vehicle network voltage between approximately 40% and 300% of its nominal value, in a cost-effective way, with good efficiency and without the need for a separate booster battery. The invention also advantageously permits simple checking interrogation of the individual components and their correct functioning.

Other objects, advantages and novel features of the present invention will become apparent from the following detailed description of the invention when considered in conjunction with the accompanying drawings.

BRIEF DESCRIPTION OF THE DRAWINGS

FIG. 1 shows the block diagram of a device constructed according to of the present invention.

FIG. 2 shows a table of the control states, converted into status signals, of individual function modules as a function of the input voltage of the device of the present invention.

DETAILED DESCRIPTION OF THE DRAWINGS:

In accordance with FIG. 1, the device 1 according to the present invention comprises a protective device 4 for externally controlled isolation of downstream loads, a voltage monitoring circuit (or processor) 11 as well as a switched-mode regulator 5 and a linear regulator 6. The outputs 5.2 and 6.2 of the regulators 5.6 act on a common output terminal 7, at which the output voltage $U_A$ of the supply connection 9 is available facing an output ground terminal 8. Optionally, the device 1 further comprises at least one upstream interference suppressor filter 21 and/or a status arrangement 18 for purposes of status interrogation.

The device 1 is supplied with the vehicle network voltage $U_B$ from a vehicle network 2, which comprises, for example, a battery 2.1 having a network terminal 2.2 and ground terminal 2.3 and a generator (not shown). A corresponding supply path 3 is preferably led through the interference suppressor filter 21. The input voltage $U_{IN}$, from which interference has been filtered if appropriate, reaches the protective device 4. The input voltage $U_{IN}$ is also provided via a scanning line 12.1 to a scanning input 12 to the voltage monitoring circuit 11. The operating power of the voltage monitoring circuit is drawn via a feedline 10.3 from a supply node 10. The protective device 4 at its output side provides the supply node 10 with a supply voltage $U_P$ protected against overvoltage. The switched-mode regulator 5 and the linear regulator 6 are supplied with the protected supply voltage $U_P$ from the supply node 10 via corresponding feedlines 10.1 and 10.2. Activating inputs 4.1, 5.1 and 6.1 of the protected device 4 and the switched-mode regulator 5 and the linear regulator 6, respectively, are connected to corresponding outputs 15 (DE for load-dump enable), 14 (SE for switch-mode enable) and 13 (LE for linear-mode enable) of the voltage monitoring circuit 11.

The same three outputs from the voltage monitoring circuit 11 can optionally also be provided to a status arrangement 18 for status encoding by at least one control line 19, and interrogated by a readout line 20. In the illustrated embodiment, the voltage monitoring circuit 11 has an input 16 to which a logic switching signal can be input.

The functioning of the device I of the present invention is now explained with reference to the table shown in accordance with FIG. 2 for an exemplary application with a desired output voltage UA of 5 volts.

If $0 < U_{IN} < 5.5$ volts is true for the input voltage, the DE, SE and LE outputs 13 to 15 are all situated at a uniform logic potential, for example at zero potential, by way of supposition. This is guaranteed, for example, by using measurement technology to evaluate the instantaneous voltage $U_{IN} < 5.5$ volts at the input 12 and/or by virtue of a certain minimum value of the operating voltage $U_P$ to be fed to the voltage monitoring circuit For example, the voltage monitoring circuit 11 is provided such that at least in a specific range of an applied operating voltage $0 < U_P < 5.5$ volts, the circuit 11 emits logic zero levels even if because of a lack of a sufficient operating voltage it is not yet possible to make any measurement. The voltage monitoring circuit 11 further comprises its own limiting or stabilizing means for obtaining an internally stabilized operating voltage from a supply voltage $U_P$ sufficient in each case for that purpose.

After excitation by at least one interrogation signal on the line 19, the status arrangement 18, provided optionally in addition in certain embodiments, emits, for example, the status value "0" in the input voltage range $0 < U_{IN} < 5.5$ volts on the line 20.

If the voltage monitoring circuit 11 recognizes an input voltage 5.5 volts $< U_{IN} < 10$ volts, the LE output 13 is activated, as is therefore the linear regulator 6 via the input 6.1. The status arrangement 18 assigns the status value "1" to this state.

For a desired output voltage $U_A = 5.0$ volts and an input voltage range from 5.5 to 10 volts, a linear regulator structure delivers a useful efficiency, by contrast with a switched-mode regulator, if the switched-mode regulator is to be optimized in terms of efficiency for the range of the nominal to three-times the vehicle network voltage, as is the basis here according to the invention. To this extent, switching off the linear regulator 6 from an input voltage of 10 volts also limits its incidence of heat loss, which is to be dissipated via cooling surfaces that should be as small as possible for reasons of space and cost.

If the voltage monitoring circuit 11 recognizes an input voltage 9.5 volts $< U_{IN} < 40$ volts, the SE output 14 is activated, as is therefore the switched-mode regulator 5 via the input 5.1. The status arrangement 18 assigns to this the status value "2" in the overlapping input voltage range $9.5 < U_{IN} < 10$ volts, and the status value "3" in the adjoining input voltage range 10 volts $< U_{IN} < 40$ volts.

If the voltage monitoring circuit 11 recognizes, for example, an input voltage $U_{IN} < 40$ volts, the DE and SE outputs 13 and 14 are set to logic zero potential, and the DE output 15 is activated, as is therefore the protective device 4 via the input 4.1. At least for a certain minimum duration, this isolates the supply node 10 from the input voltage $U_{IN}$ on the line 3 for the purpose of disconnection. In certain embodiments of the invention, the regulators 5 and 6 contain capacitive storage means 5A, 6A which guarantee a delivery of current from the output 9 to a downstream load in a bridging fashion through the duration of a load-dumping state of up to 300 ms.

The LE, SE and DE outputs 13 to 15 can either all be set to logic zero level by a switching signal at the input 16 of the voltage monitoring circuit 11, or it is possible thereby for only the LE and SE outputs 13 and 14 to be set to logic zero level and the DE output 15 to logic active level. In this way, the power supply can be switched on and off by remote control via the line 17. A special output-side decoupling of the two regulators 5 and 6 can be eliminated by appropriate configuration of the output circuits of these regulators 5, 6, or else be provided (in a manner not represented) in the form of at least one special, additional coupling element.

The optional interference suppressor filter 21 according to the invention serves to filter out very rapid overvoltage peaks and high-frequency interference superimpositions of any type on the vehicle direct voltage $U_8$. As a result, the required measuring or scanning bandwidth of the input 12 of the voltage monitoring circuit 11 can be kept within practicable limits, in order to avoid instances of erroneous triggering of the protective device 4 already by very short interference peaks. For this purpose, the interference suppressor filter 21 has at least one pronounced lowpass function.

The optionally provided arrangement 18 according to the invention for the status interrogation of the various possible operating states permits a simple inclusion of the device 1 into an automatic self-testing or fault-locating routine by means of a central monitoring computer in the motor vehicle.

The device 1 can also be designed analogously for other voltage limits for the activation or deactivation of the regulators 5 and 6 and the protective device 4, depending upon the level of the nominal vehicle network voltage and desired output voltage.

The device 1 according to the present invention can entirely replace conventional power supplies having a special battery. Due to its favorable degree of efficiency over a wide input voltage range, it requires only relatively little coolant, and therefore little room, and also proves, to this extent, to be easy to produce and cost-effective.

The internal structure of the voltage monitoring circuit 11 and the status arrangement 18 can be of any conventional logic design selected by one of ordinary skill in the art to provide the desired signals in response to the input voltage level $U_{IN}$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Device for supplying power to an electronic computer in a motor vehicle, comprising:

first and second voltage regulators, operable independently of one another and having parallel inputs and outputs, and in which a desired output voltage is regulated downwards from an input voltage provided by a vehicle network, the first and second regulators each including at least one capacitive storage means at their inputs;

a protective device coupled to the inputs of the first and second regulators, said protective device including means for connecting and disconnecting the first and second regulators from the input voltage; and a voltage monitoring circuit coupled to the first and second regulators and the protective device, which said voltage monitoring circuit detects and evaluates the input voltage to be regulated downward from the vehicle network and includes at least one output each for individually controlling activation, voltage range by voltage range, of the first and second regulators and the protective device;

said voltage monitoring circuit including means for controlling, as a function of an evaluation result of the input voltage to be regulated downwards:

no activation of the first and second regulators in an input voltage range from zero up to a first limit;

activation of the first regulator in the input voltage range exclusively between said first and a second limit;

activation of the second regulator in the input voltage range exclusively between a third and a fourth limit, the third limit being below and the fourth limit above the second limit; and activation of the protective device above the fourth limit for disconnecting said first and second regulators from the input voltage to be regulated downwards.

2. The device according to claim 1, wherein the first regulator is a linear regulator and the second regulator is a switched-mode regulator.

3. The device according to claim 1, wherein for a nominal vehicle network voltage of 14 volts and an output voltage, to be regulated downwards of 5 volts, the first limit is 5.5 volts, the second limit is 10 volts, the third limit is 9.5 volts, and the fourth limit is above 30 volts.

4. The device according to claim 1, further comprising a filter that suppresses high-frequency interference signals coupled to an input of the protective device and an input of the voltage monitoring circuit.

5. The device according to claim 4, wherein the threshold frequency for detecting and evaluating the input voltage to be regulated downwards in the voltage monitoring circuit is tuned to the threshold frequency of the filter.

6. The device according to claim 1, further comprising an arrangement for status interrogation having inputs coupled to outputs of the voltage monitoring circuit, said arrangement having at least one output at which a signal encoding the respective control state is readable.

7. The device according to claim 1, wherein the voltage monitoring circuit has a further input to which a logic signal is providable for the priority setting of all outputs to respective non-activating levels.

8. The device according to claim 1, wherein the voltage monitoring circuit has a further input to which a logic signal is providable for the simultaneous priority setting of the voltage monitoring circuit outputs that are coupled to the inputs of the first and second regulators to the non-activating level, and the voltage monitoring circuit output that is coupled to the protective device to the activating level.

9. The device according to claim 2, wherein for a nominal vehicle network voltage of 14 volts and an output voltage, to be regulated downwards of 5 volts, the first limit is 5.5 volts, the second limit it is 10 volts, the third limit is 9.5 volts, and the fourth limit is above 30 volts.

10. The device according to claim 2, further comprising a filter that suppresses high-frequency interference signals coupled to an input of the protective device and an input of the voltage monitoring circuit.

11. The device according to claim 2, wherein the threshold frequency for detecting and evaluating the input voltage to be regulated downwards in the voltage monitoring circuit is tuned to the threshold frequency of the filter.

12. The device according to claim 2, further comprising an arrangement for status interrogation having inputs coupled to outputs of the voltage monitoring circuit, said arrangement having at least one output at which a signal encoding the respective control state is readable.

13. The device according to claim 2, wherein the voltage monitoring circuit has a further input to which a logic signal is providable for the priority setting of all outputs to respective non-activating levels.

14. The device according to claim 2, wherein the voltage monitoring circuit has a further input to which a logic signal is providable for the simultaneous priority setting of the voltage monitoring circuit outputs that are coupled to the inputs of the first and second regulators to the non-activating level, and the voltage monitoring circuit output that is coupled to the protective device to the activating level.

* * * * *